US007827265B2

(12) United States Patent
Cheever et al.

(10) Patent No.: US 7,827,265 B2
(45) Date of Patent: Nov. 2, 2010

(54) SYSTEM AND METHOD FOR CONFIRMING AN ASSOCIATION IN A WEB-BASED SOCIAL NETWORK

(75) Inventors: Charlie Cheever, Palo Alto, CA (US);
Chris Putnam, Palo Alto, CA (US);
Aditya Agarwal, San Francisco, CA (US); Ezra Callahan, Palo Alto, CA (US); Bob Trahan, Palo Alto, CA (US)

(73) Assignee: Facebook, Inc., Palo Alto, CA (US)

( * ) Notice: Subject to any disclaimer, the term of this patent is extended or adjusted under 35 U.S.C. 154(b) by 601 days.

(21) Appl. No.: 11/726,962

(22) Filed: Mar. 23, 2007

(65) Prior Publication Data
US 2008/0235353 A1    Sep. 25, 2008

(51) Int. Cl.
*G06F 15/173* (2006.01)
(52) U.S. Cl. ...................................... 709/223
(58) Field of Classification Search ................. 709/223
See application file for complete search history.

(56) References Cited

U.S. PATENT DOCUMENTS

| | | | |
|---|---|---|---|
| 5,937,413 | A | 8/1999 | Hyun |
| 6,029,141 | A | 2/2000 | Bezos |
| 6,269,369 | B1 | 7/2001 | Robertson |
| 6,889,213 | B1 | 5/2005 | Douvikas et al. |
| 7,013,292 | B1 | 3/2006 | Hsu |
| 7,069,308 | B2 | 6/2006 | Abrams |
| 7,249,123 | B2 | 7/2007 | Elder |
| 7,269,590 | B2 | 9/2007 | Hull |
| 7,353,199 | B1 | 4/2008 | DiStefano |
| 2001/0027472 | A1* | 10/2001 | Guan .......................... 709/203 |
| 2001/0037721 | A1 | 11/2001 | Hasegawa |
| 2002/0059201 | A1 | 5/2002 | Work |
| 2003/0145093 | A1 | 7/2003 | Oren |
| 2003/0222918 | A1 | 12/2003 | Coulthard |
| 2003/0225632 | A1 | 12/2003 | Tong |
| 2004/0024846 | A1 | 2/2004 | Randall |
| 2004/0088177 | A1 | 5/2004 | Travis |
| 2004/0148275 | A1 | 7/2004 | Achlioptas |

(Continued)

OTHER PUBLICATIONS

Flores, Fernando et al. "Computer systems and the design of organizational interaction." In ACM Transactions on Information Systems (TOIS), vol. 6, Issue 2, Apr. 1988.

(Continued)

*Primary Examiner*—John Follansbee
*Assistant Examiner*—Imad Hussain
(74) *Attorney, Agent, or Firm*—Fenwick & West LLP (57) ABSTRACT

A method for confirming a request for an association with an organization by a user of a web-based social network is disclosed. In one embodiment, the request includes an e-mail address not controlled by the organization. The request may also be part of an application for membership with the web-based social network. A determination is made whether the request is accepted based at least partially on a specified number of prior requests for association with the organization or being identified as a member of the organization by another user already a member of the organization. The organization may be a high school, a college, a university, a business, a non-profit company, or any other group of people who may desire to associate with each other.

16 Claims, 9 Drawing Sheets

U.S. PATENT DOCUMENTS

| | | | |
|---|---|---|---|
| 2005/0021750 A1 | 1/2005 | Abrams | |
| 2005/0114759 A1 | 5/2005 | Williams | |
| 2005/0154639 A1 | 7/2005 | Zetmeir | |
| 2005/0159970 A1 | 7/2005 | Buyukkokten | |
| 2005/0171799 A1 | 8/2005 | Hull | |
| 2005/0171955 A1 | 8/2005 | Hull | |
| 2005/0177385 A1 | 8/2005 | Hull | |
| 2005/0197846 A1 | 9/2005 | Pezaris | |
| 2005/0198020 A1 | 9/2005 | Garland | |
| 2005/0198031 A1 | 9/2005 | Pezaris | |
| 2005/0198305 A1 | 9/2005 | Pezaris | |
| 2005/0203807 A1 | 9/2005 | Bezos | |
| 2005/0216300 A1 | 9/2005 | Appelman | |
| 2005/0216550 A1 | 9/2005 | Paseman | |
| 2005/0235062 A1 | 10/2005 | Lunt | |
| 2005/0256756 A1 | 11/2005 | Lam | |
| 2005/0267766 A1* | 12/2005 | Galbreath et al. | 705/1 |
| 2006/0041543 A1 | 2/2006 | Achlioptas | |
| 2006/0042483 A1 | 3/2006 | Work | |
| 2006/0048059 A1 | 3/2006 | Etkin | |
| 2006/0052091 A1 | 3/2006 | Onyon | |
| 2006/0080613 A1 | 4/2006 | Savant | |
| 2006/0085259 A1* | 4/2006 | Nicholas et al. | 705/14 |
| 2006/0085419 A1 | 4/2006 | Rosen | |
| 2006/0136419 A1 | 6/2006 | Brydon | |
| 2006/0143183 A1 | 6/2006 | Goldberg | |
| 2006/0161599 A1 | 7/2006 | Rosen | |
| 2006/0184617 A1 | 8/2006 | Nicholas | |
| 2006/0190281 A1 | 8/2006 | Kott | |
| 2006/0194186 A1 | 8/2006 | Nanda | |
| 2006/0218225 A1 | 9/2006 | Hee Voon | |
| 2006/0229063 A1 | 10/2006 | Koch | |
| 2006/0230061 A1 | 10/2006 | Sample | |
| 2006/0247940 A1 | 11/2006 | Zhu | |
| 2006/0248573 A1 | 11/2006 | Pannu | |
| 2006/0256008 A1 | 11/2006 | Rosenberg | |
| 2006/0265227 A1 | 11/2006 | Sadamura | |
| 2006/0293976 A1 | 12/2006 | Nam | |
| 2007/0037574 A1* | 2/2007 | Libov et al. | 455/435.2 |
| 2007/0162458 A1* | 7/2007 | Fasciano | 707/10 |
| 2007/0162547 A1* | 7/2007 | Ross | 709/204 |
| 2007/0174389 A1 | 7/2007 | Armstrong | |
| 2007/0208916 A1 | 9/2007 | Tomita | |
| 2007/0282987 A1 | 12/2007 | Fischer | |
| 2008/0005076 A1 | 1/2008 | Payne | |
| 2008/0010343 A1 | 1/2008 | Escaffi | |
| 2008/0033739 A1* | 2/2008 | Zuckerberg et al. | 705/1 |
| 2008/0033776 A1 | 2/2008 | Marchese | |
| 2008/0033959 A1* | 2/2008 | Jones | 707/9 |
| 2008/0040428 A1 | 2/2008 | Wei | |
| 2008/0070697 A1 | 3/2008 | Robinson | |
| 2008/0086458 A1 | 4/2008 | Robinson | |
| 2008/0133716 A1* | 6/2008 | Rao et al. | 709/220 |
| 2008/0288277 A1* | 11/2008 | Fasciano | 705/1 |

OTHER PUBLICATIONS

ChipIn. ChipIn: The easy way to collect money [online], Dec. 15, 2006 http://web.archive.org/web/20061215090739/www.chipin.com/overview.

Parzek, E. Social Networking to ChipIn to a Good Cause [online]. Business Design Studio, Jun. 29, 2006 http://www.businessdesignstudio.com/resources/blogger/2006/06social-networking-tochipin-to-good.html.

U.S. Appl. No. 11/639,655, Mark Zuckerberg, Systems and Methods for Social Mapping, filed Dec. 14, 2006.

U.S. Appl. No. 11/646,206, Aaron Sittig, Systems and Methods for Generating a Social Timeline, filed Dec. 26, 2006.

U.S. Appl. No. 11/493,291, Mark Zuckerberg, Systems and Methods for Dynamically Generating a Privacy Summary, filed Jul. 25, 2006.

U.S. Appl. No. 11/701,698, Jed Stremel, System and Method for Digital File Distribution, filed Feb. 2, 2007.

U.S. Appl. No. 11/713,455, Jed Stremel, Systems and Methods for Automatically Locating Web-Based Social Network Members, filed Feb. 28, 2007.

U.S. Appl. No. 11/701,566, Jed Stremel, System and Method for Automatic Population of a Contact File with Contact Content and Expression Content, filed Feb. 2, 2007.

U.S. Appl. No. 11/502,757, Andrew Bosworth, Systems and Methods for Generating Dynamic Relationship-Based Content Personalized for Members of a Web-Based Social Network, filed Aug. 11, 2006.

U.S. Appl. No. 11/503,093, Andrew Bosworth, Systems and Methods for Measuring User Affinity in a Social Network Environment, filed Aug. 11, 2006.

U.S. Appl. No. 11/503,037, Mark Zuckerberg, Systems and Methods for Providing Dynamically Selected Media Content to a User of an Electronic Device in a Social Network Environment, filed Aug. 11, 2006.

U.S. Appl. No. 11/503,242, Mark Zuckerberg, System and Method for Dynamically Providing a News Feed About a User of a Social Network, filed Aug. 11, 2006.

U.S. Appl. No. 11/499,093, Mark Zuckerberg, Systems and Methods for Dynamically Generating Segmented Community Flyers, filed Aug. 2, 2006.

U.S. Appl. No. 11/580,210, Mark Zuckerberg, System and Method for Tagging Digital Media, filed Oct. 11, 2006.

U.S. Appl. No. 11/893,493, Arieh Steinberg, Web-Based Social Network Badges, filed Aug. 15, 2007.

U.S. Appl. No. 11/982,974, Ruchi Sanghvi, Systems and Methods for a Web-Based Social Networking Environment Integrated Within One or More Computing and/or Networking Applications, filed Nov. 5, 2007.

U.S. Appl. No. 11/701,595, Ezra Callahan, System and Method for Determining a Trust Level in a Social Network Environment, filed Feb. 2, 2007.

U.S. Appl. No. 11/701,744, Andrew Bosworth, System and Method for Curtailing Objectionable Behavior in a Web-Based Social Network, filed Feb. 2, 2007.

U.S. Appl. No. 11/796,184, Jared S. Morgenstern, System and Method for Giving Gifts and Displaying Assets in a Social Network Environment, filed Apr. 27, 2007.

U.S. Appl. No. 11/893,797, Yun-Fang Juan, System and Method for Invitation Targeting in a Web-Based Social Network, filed Aug. 16, 2007.

U.S. Appl. No. 11/893,820, Yun-Fang Juan, Systems and Methods for Keyword Selection in a Web-Based Social Network, filed Aug. 16, 2007.

U.S. Appl. No. 11/899,426, Jared Morgenstern, System and Method for Collectively Giving Gifts in a Social Network Environment, filed Sep. 5, 2007.

U.S. Appl. No. 12/072,003, Arieh Steinberg, Systems and Methods for Implementation of a Structured Query Language Interface in a Distributed Database Environment, filed Feb. 21, 2008.

U.S. Appl. No. 12/077,070, Dave Fetterman, Systems and Methods for Network Authentication, filed Mar. 13, 2008.

U.S. Appl. No. 12/154,504, Adam D'Angelo, Personalized Platform for Accessing Internet Applications, filed May 23, 2008.

U.S. Appl. No. 12/156,091, Mark Zuckerberg, Systems and Methods for Auction Based Polling, filed May 28, 2008.

U.S. Appl. No. 12/151,734, Jared Morgenstern, Systems and Methods for Classified Advertising in an Authenticated Web-Based Social Network, filed May 7, 2008.

U.S. Appl. No. 12/154,886, Nico Vera, Systems and Methods for Providing Privacy Settings for Applications Associated with a User Profile, filed May 27, 2008.

U.S. Appl. No. 60/965,624, Adam D'Angelo, Systems and Methods for Targeting Advertisements in a Social Network Environment, filed Aug. 20, 2007.

U.S. Appl. No. 11/893,559, Adam D'Angelo, Platform for Providing a Social Context to Software Applications, filed Aug. 15, 2007.

U.S. Appl. No. 60/967,842, Ezra Callahan, Systems and Methods for Dynamically Updating Privacy Settings, filed Sep. 7, 2007.

U.S. Appl. No. 60/966,442, Ezra Callahan, System and Method for Incorporating an Entity or Group other than a Natural Person into a Social Network, filed Aug. 28, 2007.

U.S. Appl. No. 60/965,852, Adam D'Angelo, Systems and Methods for Advertising, filed Aug. 22, 2007.

U.S. Appl. No. 61/005,614, Yishan Wong, Systems and Methods for Community Translations on a Web-Based Social Network, filed Dec. 5, 2007.

U.S. Appl. No. 12/080,808, Peter Deng, Systems and Methods for Calendaring, filed Apr. 2, 2008.

* cited by examiner

Register for Facebook　　　　　　　login　register help

Create Your Account
All fields are required to register.

510 → Full Name: [          ]

520 → I am:
- In college/graduate school
- At a company
- In high school
- None of the above

610 →

High School: Palo Alto High School

620 → Class Year: 2010 ▼

630 →

E-mail address: [          ]

Password: [          ]

Birthday: Month: ▼  Day: ▼  Year: ▼

Register Now!

PRIOR ART

FIG. 9 ial Ser. No. 11/701,595 filed on Feb. 2,
SYSTEM AND METHOD FOR CONFIRMING AN ASSOCIATION IN A WEB-BASED SOCIAL NETWORK

CROSS-REFERENCE TO RELATED APPLICATIONS

The present application incorporates by reference:

U.S. patent application Ser. No. 11/701,595 filed on Feb. 2, 2007, entitled "System and Method for Determining a Trust Level in a Social Network Environment,"

U.S. patent application Ser. No. 11/701,744 filed on Feb. 2, 2007, entitled "System and Method for Curtailing Objectionable Behavior in a Web-Based Social Network,"

U.S. Provisional Patent Application Serial No. 60/906,961 filed on Mar. 13, 2007, entitled "Systems and Methods for Network Authentication."

The disclosures of all of the above U.S. patents and patent applications are incorporated by reference herein.

BACKGROUND OF THE INVENTION

1. Field of the Invention

The present invention relates generally to social networks, and more particularly to confirming associations in a social network.

2. Description of Related Art

Users of a social network may request an association with an organization. Conventionally, a controlled e-mail address is used to confirm an association with the organization. The controlled e-mail address is any e-mail address for a domain name controlled and/or managed by the organization. For example, jjones@comcast.com is managed by Comcast. Thereby, jjones@comcast.com is a controlled e-mail address by the organization Comcast. One approach to confirming the association is to require the user to include the controlled e-mail address with the request for association. After the request is submitted, the user may receive instructions on how to complete the request in an e-mail sent to the user's controlled e-mail address. The instructions may request the user to reply to the e-mail or click a link in the e-mail. However, some organizations do not have controlled e-mail addresses and this method will not work for such organizations. Accordingly, an alternative method of confirming an association with such an organization on a social network is needed.

SUMMARY OF THE INVENTION

In one embodiment, the invention provides a method for confirming a request for an association with an organization in a social network comprising receiving the request, determining whether to grant the request, and sending a communication to the requestor indicating the determination. The request provides an e-mail address from a domain name not controlled by the organization. A determination to grant a request is based at least partially on a grant request condition being met. Some exemplary grant request conditions are that the request is part of a first group of requests, receiving positive identification as being a member of the organization by a user of the social network associated with the organization, or receiving an invitation from a user of the social network associated with the organization.

In another embodiment, the invention provides a method for confirming a request for an association with an organization, wherein a determination to grant the request is based at least in part on receiving positive identification that the requestor is a member of the organization from a user of the social network already associated with the organization.

Another embodiment of the invention provides a system for confirming an association with an organization in a social network comprising an organization database, a web-based social network database, an association module, and a communication module. The organization database is configured to store information about organizations and e-mail addresses controlled by the organizations. The web-based social network database is configured to store information about a user and a user's association with an organization. The association module configured to determine whether to grant a requestor's request for the association, the grant based at least in part on receiving positive identification that the requestor is a member of the organization from the user who is already associated with the organization. The communication module is configured to receive the request for the association with the organization and to send a communication indicating the determination.

BRIEF DESCRIPTION OF THE DRAWINGS

FIG. 6 is an exemplary interface display such as might be displayed to a requester to request association with a high school as part of an application for membership in a social network according to one embodiment.

DETAILED DESCRIPTION OF THE INVENTION

Systems and methods for requesting an association with an organization in a social network wherein the requester does not submit an organization's controlled e-mail address (CEA) are provided. The organization's CEA is an e-mail address from a domain name controlled and/or managed by the organization. For example, comcast.com is controlled by Comcast. Thereby, any e-mail address with the domain name of comcast.com, e.g. jjones@comcast.com, is a Comcast CEA. The request may be part of an application for membership with the web-based social network but need not be.

A determination is made whether to grant the request at least partially based on a number of prior requests by other requestors received by the social network for association with the organization or based on being identified as a member of the organization by another member of the organization. The organization may be a school, a college or university, a business, a house of worship, a non-profit organization, or any other group of people who may desire to associate with each other. In some embodiments, the organizations are limited to high schools and/or other schools.

Figure 1:
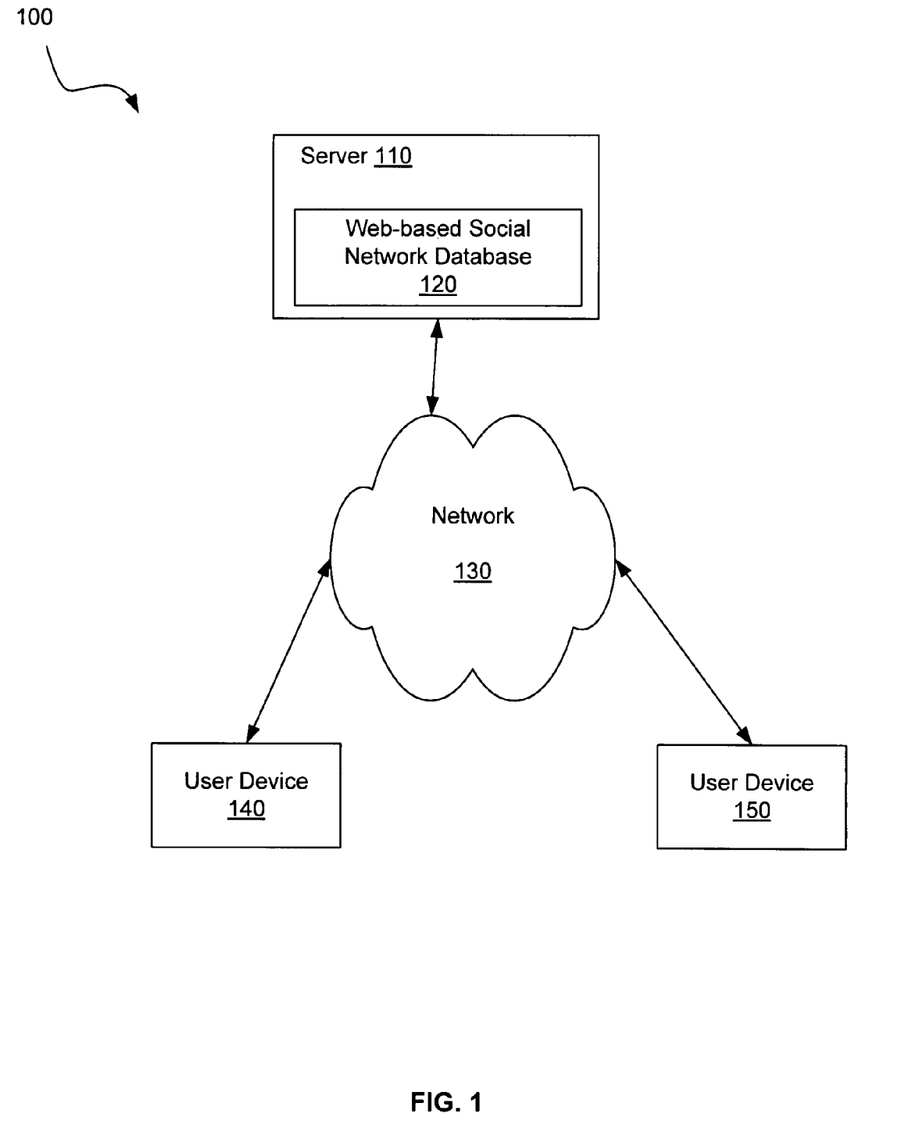
FIG. 1 illustrates an exemplary environment in which a requestor may request an association in a social network.

FIG. 1 illustrates an exemplary environment 100 in which a requestor may request an association in a social network. Environment 100 comprises a server 110, a network 130, and user devices 140 and 150. A web-based social network database 120 is located on the server 110.

The server 110 determines whether to grant a request by the requester for an associated with an organization. The database 120 maintains the granted associations between the requesters and organizations. The database 120 is discussed further herein.

The network 130 provides the medium for communication between two or more components, such as between the server 110 and the user device 140. The network 130 may be the Internet, a wireless or wired network such as mobile device carrier networks, or any other network that can be used for communication between a server and a client.

The user device 140 is a device the requester uses to request the association. The user device 150 is a device used by someone other than the requestor who is a member of the social network. User devices 140 and 150 may each be a computer or a mobile device, such as a mobile phone, a cell-phone, a smart-phone, a personal digital assistant, a notebook computer, a laptop computer or a hand-held game console. The user devices 140 and 150 communicate with the server 110 via the network 130.

Figure 2:
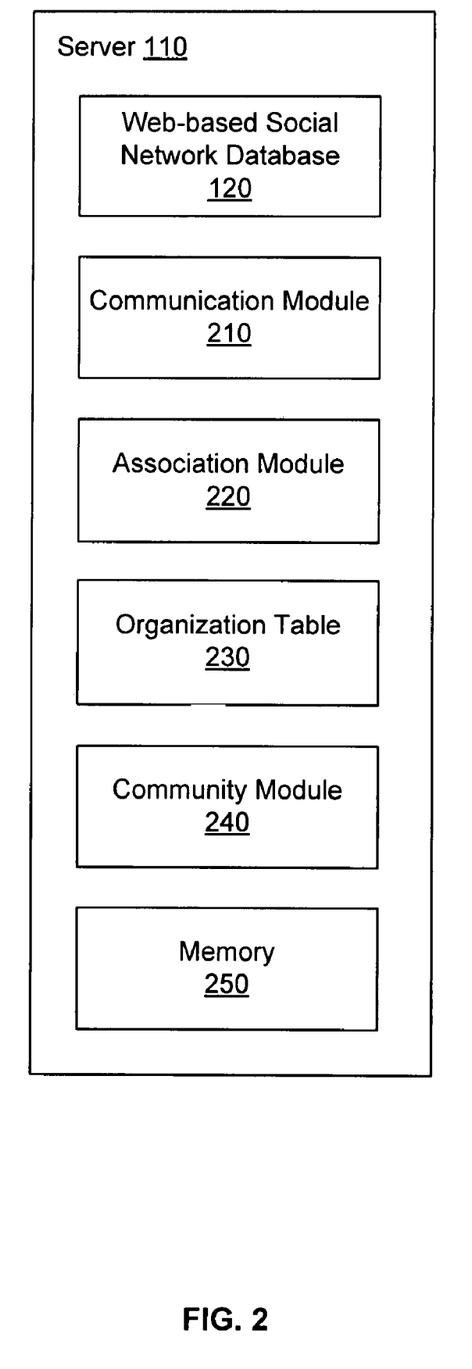
FIG. 2 illustrates an exemplary architecture of a server in a social network according to one embodiment.

FIG. 2 illustrates an exemplary architecture of a server 110 in a social network according to one embodiment. The server 110 comprises the database 120, a communication module 210, an association module 220, an organization table 230, a community module 240, and memory 250.

The communication module 210 may be used to communicate with user device 140. The association module 220 is used to determine whether to grant a request for an association with an organization. The association module 220 may rely on organization table 230 and community module 240 for the determination.

The organization table 230 contains the names of organizations and the organizations CEAs. The organization table 230 may be a database. An organization may have multiple CEAs; for example, Yahoo! Inc. controls e-mail addresses ending with yahoo.com and yahoo.net. A CEA may be controlled by, managed by, and/or associated with multiple organizations, for example, e-mail addresses ending with sbcglobal.net are associated with both Yahoo! Inc. and AT&T Inc.

In various embodiments, information in the organization table 230 is used by the association module 220 to determine if an association request is appropriate. For example, if a user submits a request for an association with an organization and the organization has a CEA, then the association module 220 may deny the request. The organization table 230 may specify if the organization restricts and/or limits the organization's CEA. For example, if Fairfield High School provides CEAs to faculty only, then students will not have access to a CEA of the organization they may request to associate. Thus, the organization table 230 may treat student requests as if there is no CEA in the request.

The community module 240 permits users associated with the organization to confirm that a requester is a member of an organization and/or to approve or deny requests for association. Confirming membership and/or approval or denial may be conducted via e-mail, via the Internet or via any other method using a device, such as the device 150.

In various embodiments, the community module 240 broadcasts a communication to users associated with the organization for which the requester is requesting association. The communication may be sent to all users associated to the organization, or to some subset of users, for example, users identified by the requester. The communication may present options to the users, such as becoming friends with the requestor. If a user befriends the requester, a presumption may be made that the requestor is a member of the organization and the request for association to the organization granted. If the user denies the friendship, the user may be prompted to confirm that the requestor is a member of the organization. In this way, the request for association may be granted without the user and the requestor becoming friends. Also, the user may respond that he/she does not know if the requester is a member. If the requestor does not receive a confirming response within a certain time period, e.g. 60 days, then the request may be denied.

In various embodiments, a request for association may need approval from a number of users who are associated with the same organization, the number of approvals being dependent on tiered groupings of requests. For example, a first group of requests may need no user approval, while a second group of requests may require one user approval, and a third group of requests may require two user approvals. In some embodiments, a request that would otherwise be granted may be denied by any user. Denials may be received by community module 240 after an e-mail is broadcast to all users with information regarding the request.

The server 110 may include memory 250 to store and run applications and/or modules. Memory 250 may also contain information and applications of other modules and/or tables. In some embodiments, modules and/or tables may reside in memory on several servers (not shown).

It will readily be appreciated by one of skill in the art that the database 120 may also function as a standalone application, separate from server 110. Database 120 may consists of several databases, such as an organization database which may contain or have associations with the organization table 230. Multiple combinations and locations can be configured for the applications and modules discussed herein. For example, each module may reside on a different server, modules may be added or removed, etc. All of these variations remain within the scope of the claimed invention.

Figure 3:
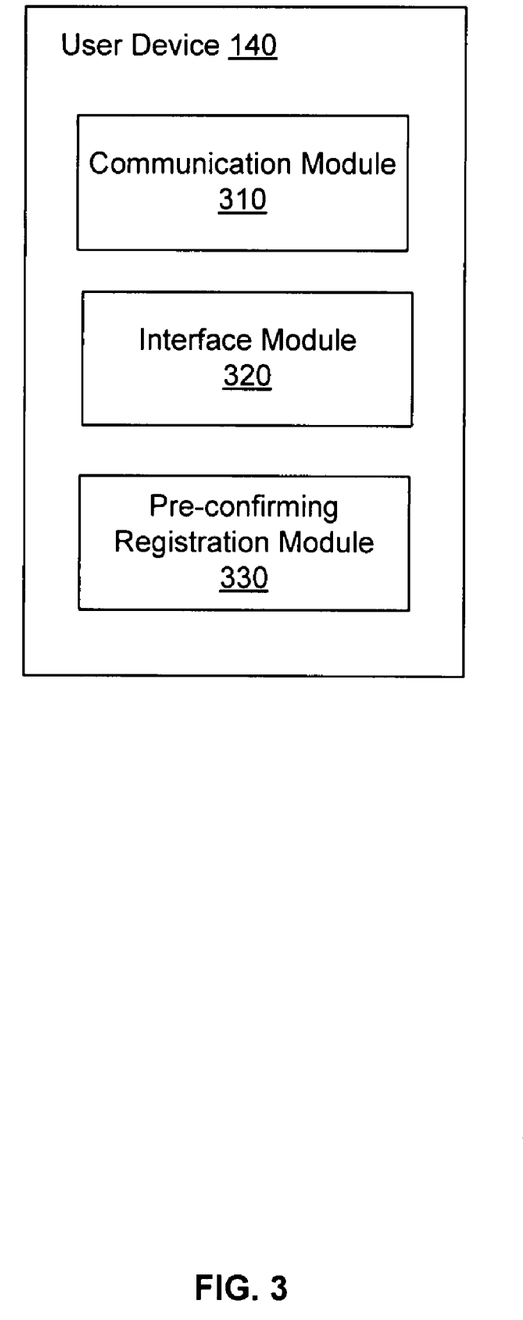
FIG. 3 illustrates an exemplary architecture of a user device in a social network according to one embodiment.

FIG. 3 illustrates an exemplary architecture of a user device 140 in a social network according to one embodiment. The user device 140 comprises a communication module 310, an interface module 320, and a pre-confirming registration module 330. The communication module 310 communicates with the server 110 via the network 130. The interface module 320 permits a user to interact with the user device 140.

The pre-confirming registration module 330 allows the user device 140 to be registered as a device associated with the organization; thereafter, the user device 140 is a pre-confirmed device. The pre-confirmed device may be used by multiple users to make requests for association with the organization. In some embodiments, the pre-confirmed device automatically grants the request for association with the organization. In other embodiments, requesting an association with an organization via the pre-confirmed device may be one requirement for approval of the association.

Figure 4:
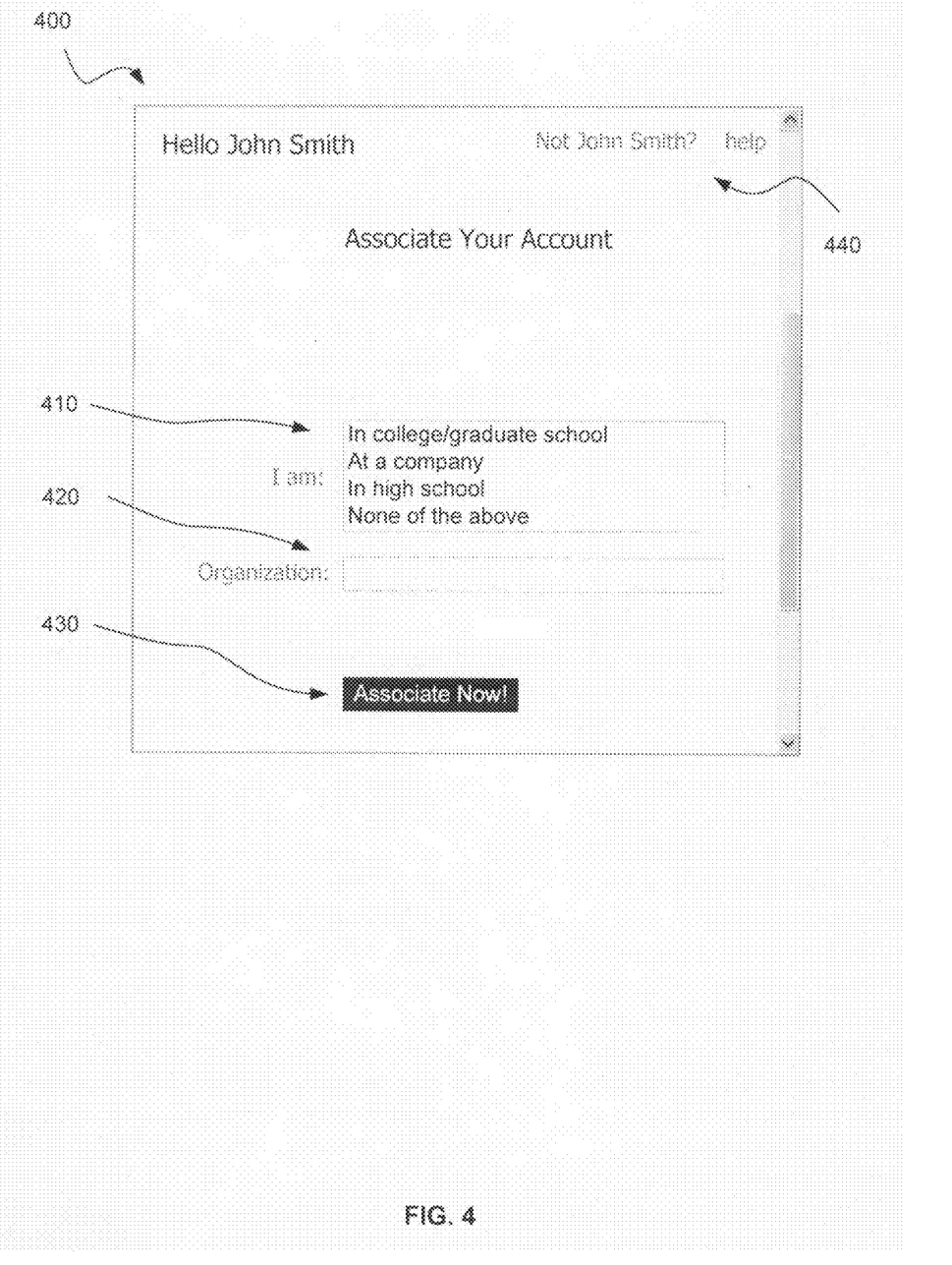
FIG. 4 is an exemplary interface display such as might be displayed to a user of a social network to request an association with an organization according to one embodiment.

FIG. 4 is an exemplary interface display 400 such as might be displayed to a user of a social network to request an association with an organization according to one embodiment. The interface display 400 illustrates information that might be shown to a user of the database 120. In the illustrated embodiment, account and association information in the interface display 400 includes an organization type selection box 410, an organization name box 420, an associate now button 430, and navigation links 440.

In some embodiments, the user requesting an association with an organization selects the type of organization from a selection box, such as organization group selection box 410. The organization type selection box 410 may be a drop down box, a toggle selection, or any other entry approach that permits a user to select and submit a type of organization.

The organization name box 420 allows the user to enter the organization name. The user may click the associate now button 430 when the user is ready to associate with an organization. The navigation links 440 may provide links for help information and/or navigation.

Figure 5:
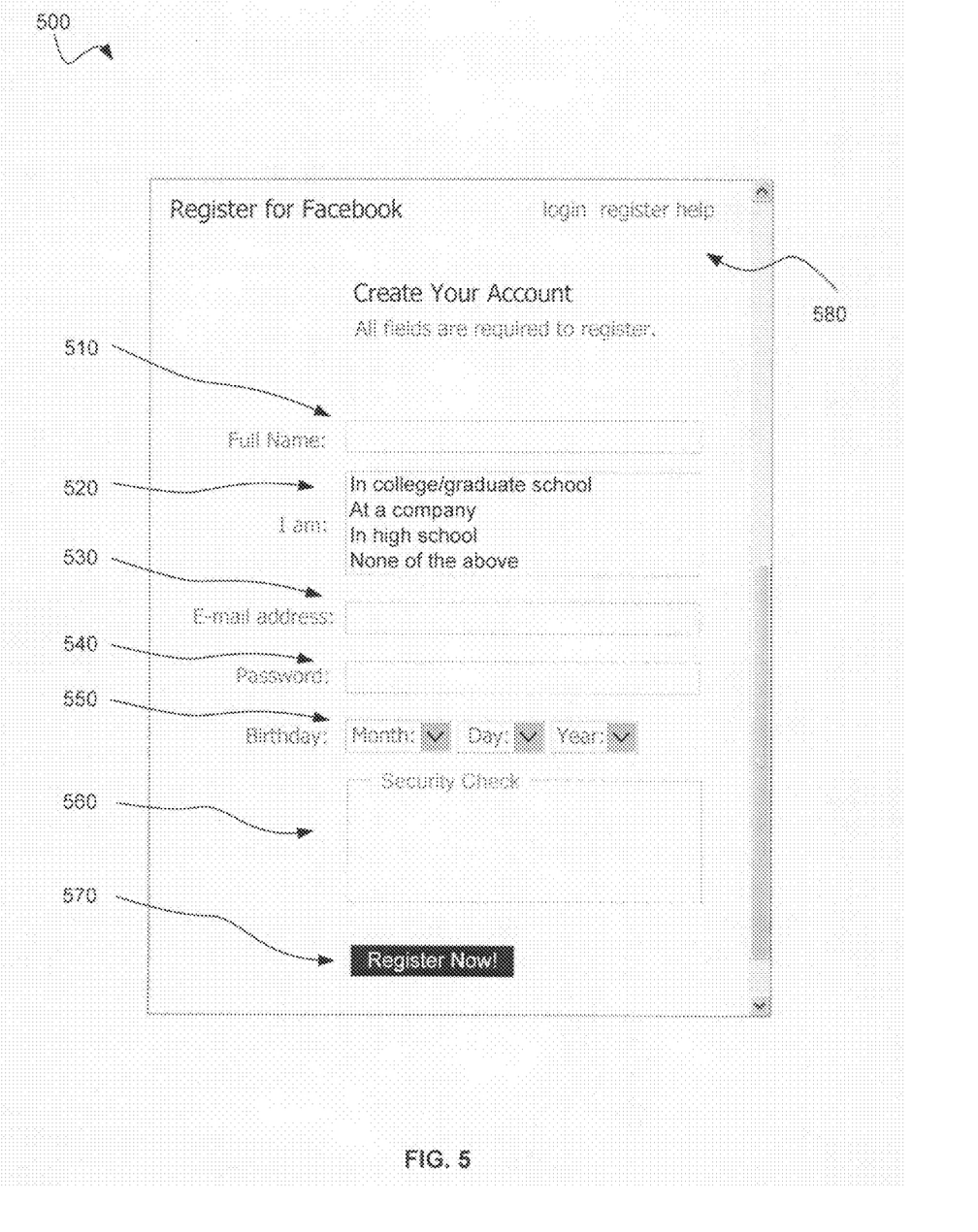
FIG. 5 is an exemplary interface display such as might be displayed to a requester to request an association with an organization as part of an application for membership in a social network according to one embodiment.

FIG. 5 is an exemplary interface display 500 such as might be displayed to a requestor to request an association with an organization as part of an application for membership in a social network according to one embodiment. The interface display 500 illustrates information that might be shown to a user of the database 120. In the illustrated embodiment, registration and association information in the interface display 500 displays a name box 510, an organization type selection box 520, an e-mail address box 530, a password box 540, birthday date boxes 550, a security check 560, a register now button 570, and navigation links 580.

The name box 510 allows a user to enter a name. The organization type selection box 520 allows a user to select the type of organization. The e-mail address box 530 allows a user to enter an e-mail address. The password box 540 allows a user to enter a password for the registered account. The birthday date boxes 550 allow a user to enter a birthday. The security check 560 may be used to ensure that a user is human as opposed to an automated system, such as the use of a captcha. The register now button 570 may be used to send user supplied and/or selected information. The navigation links 580 may provide links for help information, navigation, and/or logging in.

In some embodiments, in addition to the security check, a captcha may be presented to users who are building trust. As a trust level of the user increases, a frequency of the captcha challenge may be reduced, for example, to every third request or some other selection. Once presented, the user is required to resolve the captcha prior to interacting with the social network. This prevents the user from refreshing a screen to circumvent the captcha. For further information, please see U.S. patent application Ser. No. 11/701,595 filed on Feb. 2, 2007 for "System and Method for Determining a Trust Level in a Social Network Environment," herein incorporated by reference.

FIG. 6 is an exemplary interface display 600 such as might be displayed to a requestor to request association with a high school as part of an application for membership in a social network according to one embodiment. In various embodiments, registration and association information in the interface display 600 include a selected type 610, high school name box 620, and class year selection 630. In various embodiments, the selected type 610 is selected by clicking on a desired type and is indicated by being highlighted. The high school name box 620 allows a user to enter the name of the high school. The class year selection 630 allows a user to enter the class year.

In the illustrated embodiment, the interface display 600 has changed from that shown in FIG. 5 after a user selects the type of organization. As shown, after the user selects "In high school" from the organization type selection box 520, the high school name box 620 is displayed. In various embodiments, some information may not be requested such as a security check. Other changes may occur when the user selects a different type of organization.

Figure 7:
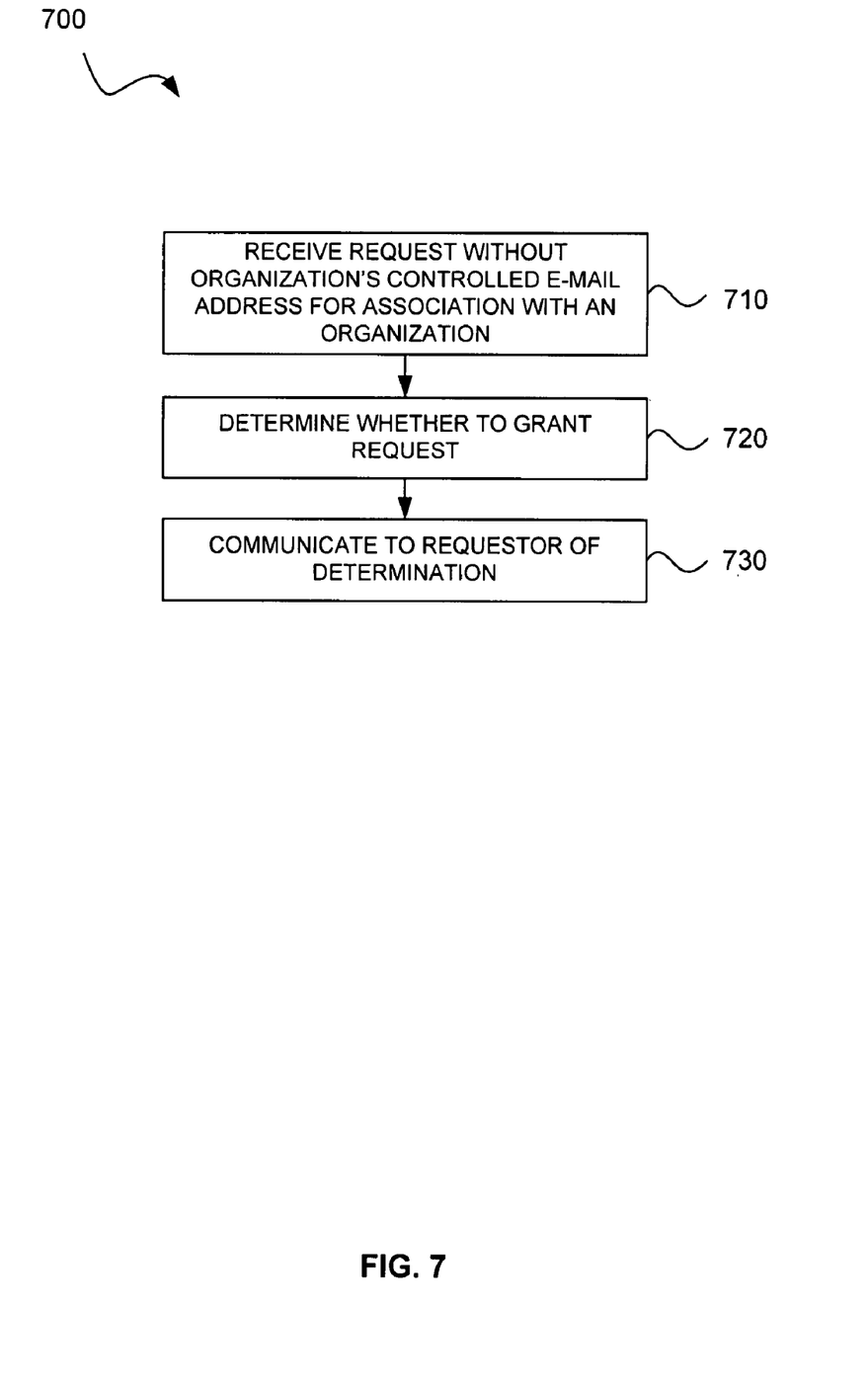
FIG. 7 is a flow chart for an exemplary method for requesting association with an organization wherein a requester does not provide a controlled e-mail address of the organization according to one embodiment.

FIG. 7 is a flow chart 700 for an exemplary method for requesting association with an organization wherein a requestor does not provide a CEA of the organization according to one embodiment. In step 710, the server 110 receives a request from a requester for an association with an organization. The server 110 may receive the request via the communication module 210.

In step 720, the server 110 determines whether to grant the request. The association module 220 may use different types of information to determine whether to grant the request. The information may include the type of organization, the organization name, whether or not the organization has a CEA, the age of the requester, a security check, and/or a grant condition being met. The grant condition may be verification by a user already associated with the organization to which the requester wishes to be associated, or may be that the requester is part of a first group of requestors for association with the organization. Step 720 is discussed further herein.

In step 730, the server 110 communicates the determination to the requester of the association. In various embodiments, the determination is displayed on a web page and/or is communicated to the requester via e-mail.

A communication indicating a denial of association may include a reason for being denied, such as that no current user of the social network could confirm that the requester is a member of the organization. Additionally, the denial of association communication may include alternative approaches the requester can take to associate with the organization. For example, the requester may be instructed to ask a user associated to the organization to invite the requester to become associated. Such an invitation may be communicated via e-mail. In other embodiments, the invitation is processed via the server 110. Alternatively, the communication may provide information regarding an open enrollment period of the organization to the requester. Enrolling during the open enrollment may be the only requirement for granting the request or there may be other requirements for allowing the requester to associate with the organization.

Figure 8:
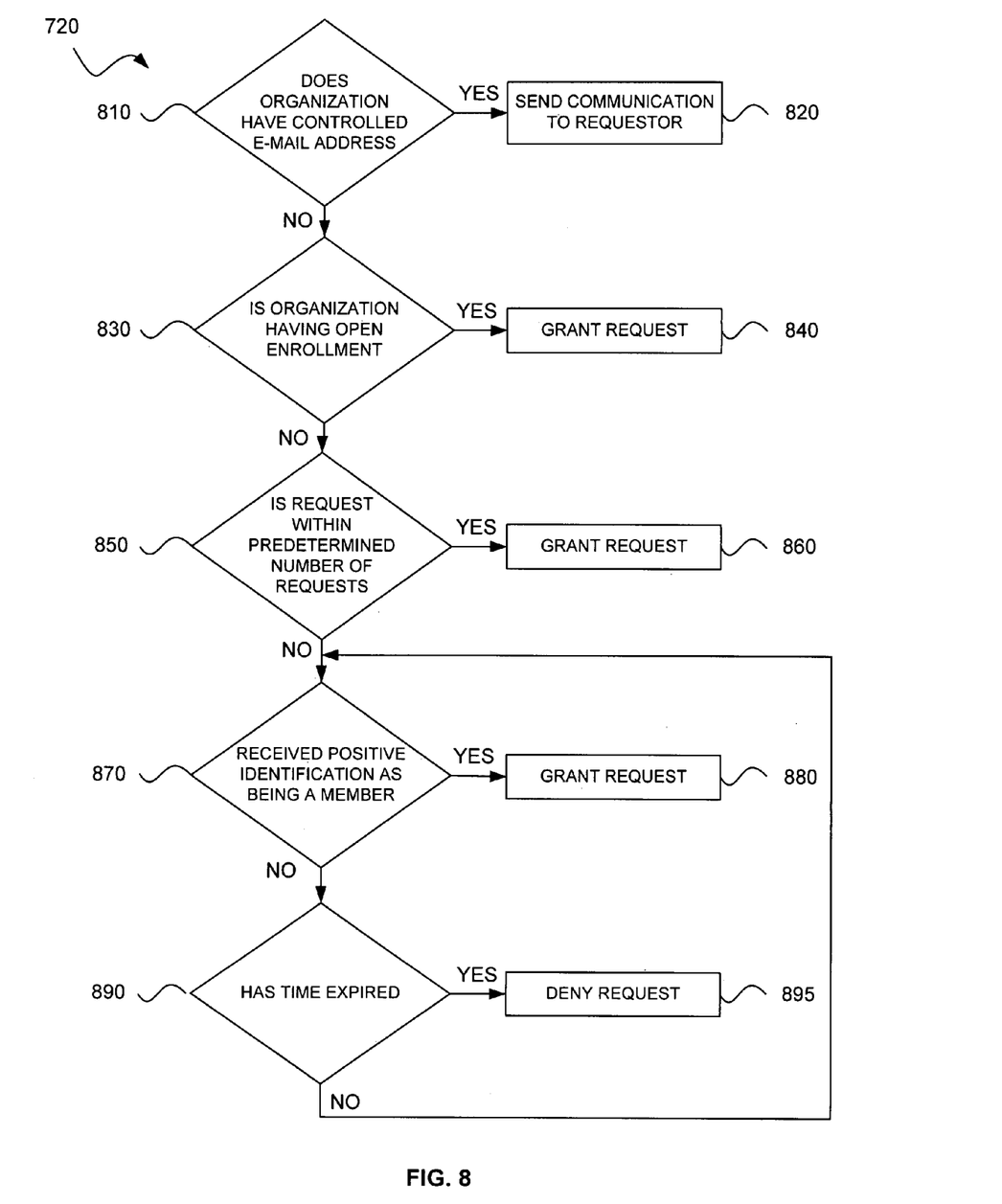
FIG. 8 is a flow chart for an exemplary method to determine whether to grant a request for an association with an organization according to one embodiment.

FIG. 8 is a flow chart for an exemplary method to determine whether to grant a request for an association with an organization, as performed in step 720 of FIG. 7, according to one embodiment. In step 810, the association module 220 checks the organization table 230 to determine if the organization has a CEA. If the organization does have a CEA, the association module 220 may still grant an association if the organization limits the CEA, as discussed herein.

In step 820, if the organization does have a CEA and the requester does not provide the CEA then the server 110 sends a communication to the requester. The communication may suggest reapplying for association with the organization and providing the organization's CEA.

In step 830, the association module 220 determines if the organization has an open enrollment. If the organization has an annual open enrollment, e.g., a high school during the first four weeks of school, then in step 840 the server 110 grants the request for association.

In step 850, the association module 220 determines if the request for association is within the first pre-determined number of requests. The first pre-determined number of requests may be an absolute number, such as fifty, or may be a relative number, such as a percentage of the members of the organization. For example, if a high school has 3000 students, and the first pre-determined number of requests is five percent, then any of the first 150 students would qualify as being part of the first pre-determined number of requests. In step 860, if the request is one of the first pre-determined number of requests, then the server 110 grants the request for association.

In step 870, the community module 240 determines if positive identification that the requestor is a member of the organization has been received. Positive identification may be from another user associated with the organization befriending the requestor or by another user associated with the organization confirming that the requestor is a member of the organization. Upon positive identification, in step 880, the request is granted. Positive identification may also be obtained by invitation from a user associated with the organization inviting other members of the organization.

In step 890, the association module 220 determines whether to deny the request based on a pre-determined time elapsing. If the per-determined time elapses, e.g., 45 or 60 days, without positive identification then the request is denied in step 895.

Figure 9:
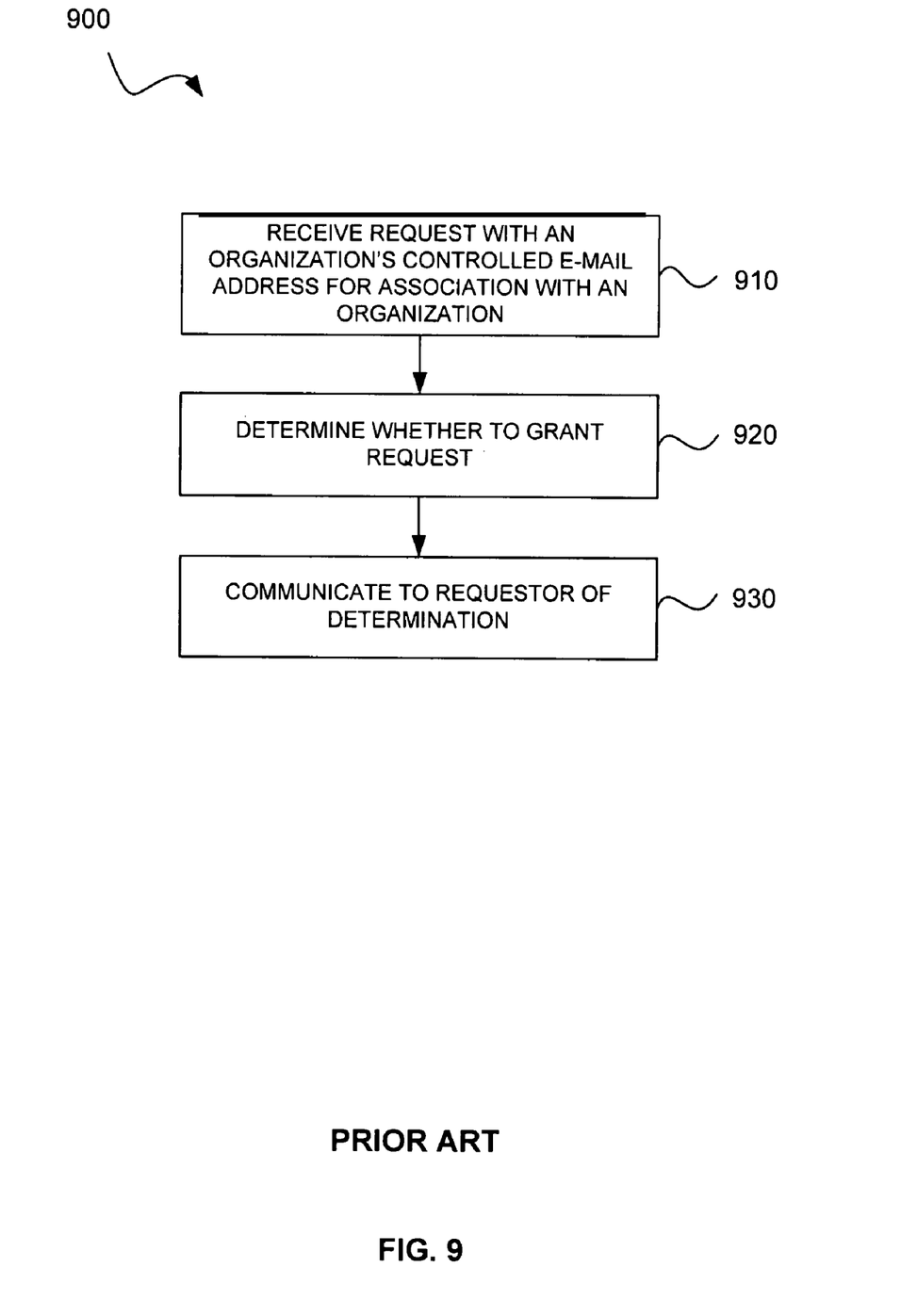
FIG. 9 is a flow chart for an exemplary method for requesting association with an organization wherein a requester does provide a controlled e-mail address of the organization as evident of prior art.

FIG. 9 is a flow chart 900 for an exemplary method for requesting association with an organization wherein a requester does provide a CEA of the organization as evident of prior art. In step 910, a server receives a request from a requestor for an association with an organization.

In step 920, the server determines whether to grant the request. The determination is based on the requester providing an organization's CEA. If the requester provides an organization's CEA, then the request is granted. Otherwise, the request is denied.

In step 930, the server communicates to the requester of the determination of the association. In various embodiments, the determination is displayed on a web page and/or is communicated to the requestor via e-mail.

While various embodiments have been described above, it should be understood that they have been presented by way of example only, and not limitation. For example, the server 110 may grant a request for association based on any number of factors, such as making a request one day after open enrollment has closed provided other conditions are satisfied and/or the day of the request is a holiday. The methods shown in FIGS. 7 and 8 are exemplary and some steps may be omitted or added and still fall within the scope of the present invention. For example, FIG. 8 may also include steps indicating that approval from a user who is associated with the organization is necessary prior to granting the request. Thus, the breadth and scope of a preferred embodiment should not be limited by any of the above-described exemplary embodiments.

What is claimed is:

1. A method for confirming an association with an online organization, the method comprising:
    maintaining a profile in a computer memory for each of a set of users of a social networking system, wherein one or more of the users are associated with an organization;
    receiving a request from a user of the social networking system to be associated with the organization, wherein the requesting user is not associated with the organization;
    determining whether to grant the request based at least in part on whether the requesting user has established a connection in the social networking system with one or more other users of the social networking system who are already associated with the organization;
    granting the request if the requesting user has established a connection in the social networking system with one or more other users of the social networking system who are already associated with the organization; and
    updating the profile of the requesting user to indicate that the requesting user is associated with the organization if the request is granted.

2. The method of claim 1, wherein the organization comprises an online group of users.

3. The method of claim 1, wherein the organization comprises an online group of users within the social networking system.

4. The method of claim 1, wherein the organization exists outside of the social networking system.

5. The method of claim 1, wherein the organization has a real-world counterpart.

6. The method of claim 5, wherein the organization is selected from a group consisting of: a school, a college, a university, a business, and a non-profit entity.

7. The method of claim 1, wherein the connection between the requesting user and the one or more other users of the social networking system who are associated with the organization is established after receiving the request.

8. The method of claim 1, wherein the request is granted only if the user has established multiple connections in the social networking system with other users of the social networking system who are already associated with the organization.

9. The method of claim 1, further comprising:
    denying the request if the requesting user has not established a connection in the social networking system with one or more other users of the social networking system who are already associated with the organization.

10. The method of claim 9, further comprising:
    responsive to denying the request, inviting the requesting user to establish a connection with one or more other users of the social networking system who are already associated with the organization.

11. A method for confirming an association with an online organization, the method comprising:
    maintaining a profile in a computer memory for each of a set of users of a social networking system, wherein one or more of the users are associated with an organization;
    maintaining social information about the users of the social networking system;
    receiving a request from a user of the social networking system to be associated with the organization, wherein the requesting user is not associated with the organization;
    determining whether to grant the request based at least in part on social information about the requesting user and one or more other users of the social networking system who are already associated with the organization;
    granting the request based at least in part on the social information about the requesting user and one or more other users of the social networking system who are already associated with the organization; and
    updating the profile of the requesting user to indicate that the requesting user is associated with the organization if the request is granted.

12. The method of claim 11, wherein the social information comprises information about one or more connections between the requesting user and the one or more other users of the social networking system who are already associated with the organization.

13. The method of claim 12, wherein the request is granted based on an existence of a number of connections between the requesting user and the one or more other users of the social networking system who are already associated with the organization.

14. The method of claim 11, wherein the social information comprises a similarity between two or more users of the social networking system.

15. The method of claim 14, wherein the social information comprises email addresses for the users of the social networking system, and wherein the request is granted based on whether the requesting user has an email address having the same domain as one or more other users of the social networking system who are already associated with the organization.

16. The method of claim 11, wherein the social information comprises confirmations by the users of the social networking system of connections with each other, and wherein the request is granted based on whether a user of the social networking system who is already associated with the organization has confirmed a connection to the requesting user after the request has been made.

* * * * *